United States Patent Office

3,128,241
Patented Apr. 7, 1964

3,128,241
WAX COMPOSITION AND METHOD OF
PRODUCING SAME
John Podlipnik, Palos Heights, and Jack F. Renner, Calumet City, Ill., assignors, by mesne assignments, to Sinclair Research, Inc., New York, N.Y., a corporation of Delaware
No Drawing. Filed Jan. 26, 1959, Ser. No. 788,772
9 Claims. (Cl. 208—21)

The present invention relates to microcrystalline wax having a high viscosity and among other things offering advantageous coating characteristics when incorporated in wax coating compositions.

During the past few years considerable time and money have been expended in the development of various wax coating compositions suitable for use in the dairy industry such as for instance, in the packaging of milk in wax-coated paperboard containers. This work has to a large extent been directed toward obtaining a smooth, uniform coating, for instance, by overcoming the serpentine effect usually occurring in applied commercial wax coating compositions.

Work has also been directed towards improving the resistance to bulging of filled paperboard containers caused by rippled coatings and reducing flaking and cracking of the wax coating during loading and storage, and towards increasing board strength and carton durability. These difficulties have been overcome to a large extent by the addition of such materials as polyethylene and microcrystalline waxes to a base paraffin wax.

The various constituents which have been added to paraffin waxes include tank bottoms microcrystalline wax, polyethylene and conventional 10 to 40 penetration microcrystalline wax derived from Pennsylvania or Mid-Continent crude oils. These components can be used with limited success but, however, each has certain undesirable properties. The tank bottoms microcrystalline waxes are relatively costly and do not have the desired flexibility and durability. The polyethylene while affording the desired flexibility and durability is costly and generally incompatible at temperatures below 160° F. and requires expensive specialized mixing equipment in order to keep it in uniform suspension when the blend is stored in the liquid state. When using conventional microcrystalline wax undesirably large amounts of this wax are required to eliminate the serpentine effect.

The present invention is directed to a new microcrystalline wax and to a method for producing it. The new wax has a higher viscosity than known microcrystalline waxes and when incorporated in a wax coating composition produces a smooth uniform coating while providing high board strength when used in paperboard carton-coating compositions. Further when the new wax is utilized in relatively small amounts in a base paraffin wax a smooth non-serpentine coating composition is formed.

The microcrystalline wax of the present invention can be obtained by treating penetration asphalt derived from a Mid-Continent, i.e., mixed base or paraffinic-naphthenic, crude oil with a solvent mixture consisting essentially of propane and butane, separating the resulting oil and asphalt phases, and separating the wax from the extracted oil as by solvent dewaxing the oil. The product of the dewaxing may then be deoiled if desired.

The penetration asphalt used in the present invention can be prepared generally by steam and vacuum distillation of the Mid-Continent oil to yield heavy bottoms having a needle penetration at 77° F. of about 25 to 350. The distillation is desirable to concentrate the desired heavy wax fraction. The penetration asphalt from the distillation is subjected to solvent deasphalting. The solvent deasphalting process of the present invention comprises treating the penetration asphalt with a solvent consisting essentially of about 20 to 90% propane, preferably at least about 50% propane, and about 10 to 80% butane at a pressure of about 400 to 650 pounds per square inch and a temperature of about 80 to 200° F. The solvent is essentially in a liquid state and the solvent to asphalt ratio is between about 3 to 11 parts solvent per part asphalt. The treatment may be performed batchwise or in a countercurrent extraction tower yielding a substantially hard, comparatively high melting point asphalt and a heavy oil which yields the new wax.

The heavy oil obtained from the solvent deasphalting can be subjected to conventional solvent dewaxing to produce a dewaxed oil and petrolatum. The petrolatum can in some instances be taken as the new wax of our invention; however, it is often preferred that the petrolatum be treated with a dewaxing solvent to reduce its oil content and yield a harder microcrystalline wax. If desired the microcrystalline wax can be further treated using conventional finishing operations such as earth percolation or mild hydrogenation. Various commercial solvents may be utilized in deoiling and dewaxing such as methylethyl ketone, toluene and benzene and their mixtures.

The microcrystalline wax produced by our process is characterized by having a petrolatum melting point (ASTM D127–49) of from about 170 to 190° F., a penetration at 77° F. (ASTM D5–25) of from about 10 to 50, a viscosity of from about 130 to 175 Saybolt seconds at 210° F. (ASTM D446–39) and upon deoiling contains a maximum of about 5% oil. The microcrystalline wax is substantially odorless and tasteless, and has a large variety of applications such as linings for beer and soft drink cans, paper laminates of good sealing strength in blends with other waxes for coating paper containers and the like and in blends with polyethylene to produce a material suitable for low temperature package applications.

It has been found that when minor amounts of the microcrystalline wax of this invention are added, for instance, in amounts of about 5 to 10%, to paraffin wax a smooth, non-serpentine coating is formed without the undesirable features associated with tank bottoms wax, polyethylene or conventional microcrystalline waxes. Further, the microcrystalline wax of this invention when incorporated with paraffin wax has high tensile strength, good flexibility and modulus of rupture. Little difficulty is encountered in producing odor-free coatings from the asphalt-derived microcrystalline wax, thus adding to its suitability for use on food containers. Little clouding and generally negligible settling occurs to a liquid wax composition containing our microcrystalline wax.

Paraffin waxes having a melting point of from about 110° F. to 155° F. are generally used with our microcrystalline wax with the paraffin wax being the major component of the compositions. A wax of melting point of about 120° to 135° F. is preferred.

The present invention may be further illustrated by the following example.

EXAMPLE I

A Mid-Continent crude oil was commercially steam-vacuum distilled to yield heavy bottoms having a needle penetration at 77° F. of 179. The penetration asphalt was treated in a 6.8 to 1 solvent to oil ratio in a countercurrent extraction tower with a solvent consisting essentially of approximately 73.3% of propane and 26.7% butane at a pressure of 450 p.s.i. and a temperature on the top of about 140° F. and on the bottom of about 100° F. The deasphalted oil was then dewaxed with a solution of 50% methylethyl ketone and 50% toluene at 0° F. by volume yielding 17.3% petrolatum having a melting point of 179° F. and a 155 Saybolt viscosity at 210° F. The petrolatum was then deoiled with a solution of 50% methylethyl ketone and 50% toluene by volume to a microwax of a 26 penetration at 77° F. which was further deoiled to a penetration of 13 at 77° F.

The following table discloses tests comparing our microcrystalline wax derived from Mid-Continent asphalt with microcrystalline waxes derived from petroleum:

*Table I*

| Laboratory Tests | Microcrystalline Wax from M-C Asphalt | Tank Bottoms Microcrystalline Wax | Pennsylvania Microcrystalline Wax |
|---|---|---|---|
| Petrolatum, M.P., °F. (ASTM D127) | 183.7 | 194.8 | 146.0 |
| Viscosity, SUS/210° F. (ASTM D446) | 139.8 | 73.4 | 80.4 |
| Penetration at 77° F. (ASTM D5) | 13 | 4 | 23 |
| Percent Oil (ASTM D721) | 0.00 | 0.71 | 0.93 |

Table II presents data illustrating the wax composition of this invention. This table describes a series of blends of 125/127 ASTM melting point paraffin wax with our new microcrystalline wax and various other waxes used in the food container industry.

*Table II*

| | Cloud Pt., °F. | Tensile Str., p.s.i. at 45° F. | Instron Bend Test at 77° F.[2] | | Viscosity, cs. at 175° F. | Appearance of Coating on Paperboard Milk Containers |
|---|---|---|---|---|---|---|
| | | | Deflection, inch×1,000 | M of R, p.s.i. | | |
| Paraffin Wax Only | None | [1] 84 | (¹) | (¹) | 4.30 | Serpentine. |
| Base Paraffin Wax Plus— | | | | | | |
| Sample 1:* | | | | | | |
| 3 Wt. Percent | 130 | 452 | 60 | 575 | 4.57 | Sl. Serpentine. |
| 5 Wt. Percent | 136 | 480 | 86 | 596 | 4.68 | Smooth. |
| 10 Wt. Percent | 144 | 528 | 152 | 606 | 5.08 | Do. |
| Sample 2:* | | | | | | |
| 0.5 Wt. Percent | 135 | 116 | 20 | 322 | 4.38 | Sl. Serpentine. |
| 1.0 Wt. Percent | 137 | 128 | 26 | 339 | 4.42 | Smooth. |
| 2.0 Wt. Percent | 146 | 188 | 38 | 392 | 4.51 | Do. |
| 5.0 Wt. Percent | 157 | 388 | 50 | 471 | 4.77 | Do. |
| Sample 3:* | | | | | | |
| 5 Wt. Percent | None | 296 | 44 | 476 | 4.61 | Serpentine. |
| 10 Wt. Percent | None | 236 | 34 | 405 | 5.11 | Do. |
| 15 Wt. Percent | None | 316 | 56 | 585 | 5.53 | Do. |
| 20 Wt. Percent | None | 360 | 104 | 490 | 6.07 | Do. |
| Sample 4:* | | | | | | |
| 5 Wt. Percent | None | | | | | Do. |
| 10 Wt. Percent | None | | | | | Do. |
| 15 Wt. Percent | None | | | | | Do. |
| 20 Wt. Percent | None | | | | | Do. |
| Sample 5:* | | | | | | |
| 5 Wt. Percent | None | 396 | 44 | 544 | 4.66 | Do. |
| 10 Wt. Percent | 131 | 396 | 54 | 546 | 5.08 | Sl. Serpentine. |
| 15 Wt. Percent | 141 | 484 | 122 | 590 | 5.55 | Smooth. |
| 20 Wt. Percent | 148 | 476 | 152 | 550 | 5.95 | Do. |
| Sample 6:* | | | | | | |
| 0.5 Wt. Percent | 168 | | | | | |
| 1.0 Wt. Percent | 175 | | | | | |
| 2.0 Wt. Percent | 181 | | | | | |

*Description of samples:
 1. Microcrystalline wax from Mid-Continent asphalt, Example I.
 2. Tank bottoms microcrystalline wax.
 3. Pennsylvania microcrystalline wax.[3]
 4. Microcrystalline wax from Mid-Continent petrolatum foots oil.[3]
 5. Microcrystalline wax from conventional Mid-Continent petrolatum.[3]
 6. 2000 Molecular weight polyethylene.[4]

[1] Unable to prepare satisfactory test specimens due to brittleness and low strength of wax.
[2] Test temperature is 77° F.; rate of deflection is 0.5 inches/minute.
[3] Prepared by conventional propane extraction and deoiling techniques.
[4] A-C polyethylene No. 6.

The tests conducted in Table II are conventional except for the flexibility and modulus of rupture tests which are as follows: A beam of the wax about 3 inches long, ½ inch wide, and 0.150 inch thick is placed on two metal supports two inches apart. The supports are attached to the load cell on an Instron Tensile Tester. A load is applied to the sample midway between the supports at a constant rate until the sample breaks. The modulus of rupture is determined by the formula:

$$M \text{ of } R \text{ (p.s.i.)} = \frac{0.0066W}{bt^2}$$

where
$W$ = load at rupture, grams
$b$ = width of sample at rupture, inches
$t$ = thickness of sample at rupture, inches The deflection or amount of bend at the break point is a measure of flexibility.

As shown above, the blends with our new type microcrystalline wax exhibit markedly better tensile strength at 45° F. and flexibility and modulus of rupture (M of R) at 77° F. than those with known commercial microcrystalline wax. Concentrations of about 5 to 10% of the new microcrystalline wax eliminated the rough, serpentine coating obtained with normal paraffin wax. Thus our high melting point microcrystalline wax extracted from Mid-Continent asphalt greatly improves coating smoothness and continuity while increasing board strength to prevent the paperboard from getting soft and ragged when incorporated in paraffin wax coatings on paperboard containers, thus overcoming the disadvantages associated with tank bottoms microcrystalline wax, conventional petroleum microcrystalline waxes, and polyethylene.

We claim:

1. A method for producing microcrystalline wax material consisting essentially of treating a penetration asphalt having a needle penetration at 77° F. of between about 25 and 350 derived from a mixed base petroleum oil with a solvent consisting essentially of about 20% to 90% propane and about 10 to 80% butane at a solvent to asphalt ratio of about 3 to 11:1 at a pressure from about 400 to 650 pounds per square inch and a temperature of about 80 to 200° F., separating the resulting oil and asphalt phases, solvent dewaxing the oil, separating the resulting dewaxed oil and petrolatum microcrystalline wax material having a petrolatum melting point of about 170° to 190° F., a penetration at 77° F. of about 10 to 50 and a viscosity of about 130 to 175 Saybolt seconds at 210° F.

2. The method of claim 1 wherein the asphalt is obtained by steam vacuum distillation of a mixed base petroleum oil.

3. The method of claim 2 wherein the solvent employed in treating the asphalt contains about 50 to 90% propane.

4. A wax composition capable of producing a smooth non-serpentine coating of improved tensile strength, flexibility and modulus of rupture consisting essentially of a major amount of paraffin wax and a minor amount of a microcrystalline wax having a petrolatum melting point of about 170° to 190° F., a penetration at 77° F. of about 10 to 50, and a viscosity of about 130 to 175 Saybolt seconds at 210° F.

5. The composition of claim 4 wherein the microcrystalline wax is about 5 to 10% of the composition.

6. The composition of claim 5 wherein the paraffin wax has a melting point of about 120 to 135° F.

7. A paperboard carton coated with the composition of claim 4.

8. A paperboard carton coated with the composition of claim 5.

9. A paperboard carton coated with the composition of claim 6.

References Cited in the file of this patent

UNITED STATES PATENTS

| | | |
|---|---|---|
| 2,137,207 | Grahame et al. | Nov. 15, 1938 |
| 2,140,485 | Terres et al. | Dec. 13, 1938 |
| 2,276,155 | Carr | Mar. 10, 1942 |
| 2,327,247 | Carr et al. | Aug. 17, 1943 |
| 2,745,791 | Knox | May 15, 1956 |
| 2,773,812 | Tench | Dec. 11, 1956 |
| 2,783,188 | Agoston | Feb. 26, 1957 |
| 2,885,341 | Tench et al. | May 5, 1959 |

FOREIGN PATENTS

| | | |
|---|---|---|
| 525,701 | Canada | May 29, 1956 |

OTHER REFERENCES

Knowles et al.: Ind. and Eng. Chem., Analytical Edition, vol. 13, 1941, pp. 314–317.

Warth: The Chemistry and Technology of Waxes, 2nd edition, 1956, Reinhold Publishing Co., New York, pp. 437–438.